May 9, 1939.  J. W. WARD  2,157,310
CIRCULAR WORK ATTACHMENT
Filed March 15, 1938
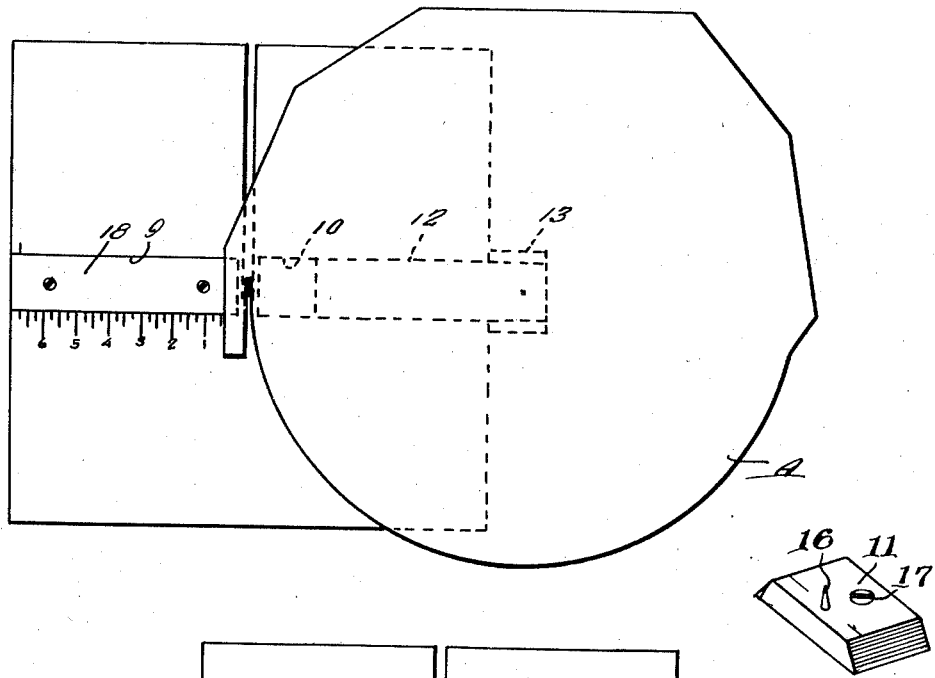
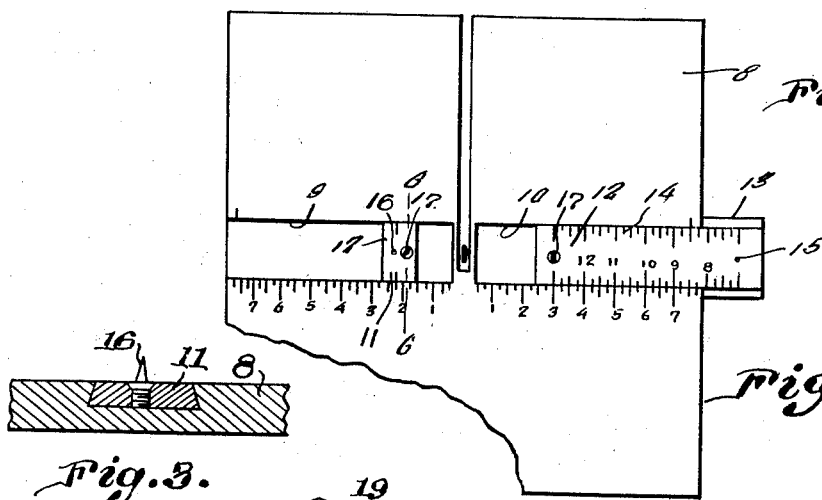
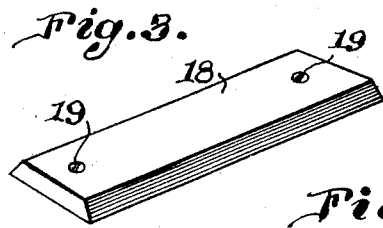
Inventor
J. W. Ward
By Clarence A. O'Brien
Hyman Berman
Attorneys Patented May 9, 1939

2,157,310

UNITED STATES PATENT OFFICE 2,157,310

CIRCULAR WORK ATTACHMENT

Jack Willard Ward, Nassawadox, Va.

Application March 15, 1938, Serial No. 196,085

1 Claim. (Cl. 143—171)

This invention appertains to new and useful improvements in saw machines and more particularly to means for use in conjunction with such machines for facilitating the execution of circular cuts.

The principal object of the present invention is to provide means for convenient use directly with the usual band scroll or jig saws without interference with the use of the machine for other kinds of work.

Other important objects and advantages of the invention will become apparent to the reader of the following specification.

In the drawing:

Figure 1 is a top plan view of the appliance, showing work controlled thereby.

Figure 2 is a top plan view of the table equipped with the appliance showing the work removed.

Figure 3 is a sectional view on the line 6—6 of Figure 2.

Figure 4 is a perspective view of one of the filler blocks.

Figure 5 is a perspective view of the short centering block.

Referring to the drawing, wherein like numerals designate like parts, numeral 6 denotes the usual band saw operating through the slot 7 of the improved table structure 8.

Extending in opposite directions away from the inner end of the slot 7 are the dovetail grooves 9—10. In one of these grooves is disposed the short centering block 11 which is of dovetail construction for slidable disposition in the groove 9 and in the other groove, whether it be groove 9 or 10, is disposed the elongated block 12 having the head 13 at its outer end for abutment with the adjacent edges of the table 8.

Graduations 14 are provided along the edges of the block 12 and also the block 11, the block 12 having the centering pin 15 at its end equipped with the head 13, while the block 11 is provided with the centering pin 16. Each of these blocks 11 and 12 is provided with a tightening screw 17 which can be driven against the bottom of the corresponding groove 9 or 10 to fasten the block in adjusted position.

As suggested in Figure 1, the work "A" can be placed over the proper block 11 or 12, for instance the block 11 if circle to be cut is small in diameter, or over the block 12 if the circle is to have a radius greater than the length of the groove 9.

Obviously, the work is rotated as the sawing operation is executed.

When the blade is to be no longer used for cutting circular work, the grooves 9—10 can be closed by disposing elongated dovetail shaped blocks 18 into the grooves and securing these blocks 18 by said screws 19. Thus the grooves can be closed and afford a smooth top surface for the table without the construction of the pins 16 and 15.

While the invention is shown illustrated with a band saw, it can be adapted for use with various other kinds of sawing machines such as scroll and jig.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A circular work attachment comprising a work table having a band saw slot and provided with oppositely extending dove-tail shaped grooves arranged at opposite sides of said slot and terminating adjacent thereto and opening outwardly through opposite edges of the table, tenon-shaped blocks slidable in grooves towards and from the slot and with their upper surfaces flush with the surface of the table and one of said blocks being of elongated formation with one end projecting beyond an edge of the table, cooperating graduations on the blocks and on the adjacent edges of said grooves, centering pins carried by said blocks on which work may pivot, and a head on the under side of the projecting end of the elongated block and positioned beyond an edge of the table to act as an abutment by engagement with the table to limit the sliding movement of said elongated block towards the slot, said centering pin of the elongated-named block being located adjacent the latter-named end of the block to always have a position laterally of one edge of the table during all adjusted positions of said elongated block with respect to the table.

JACK WILLARD WARD.